UNITED STATES PATENT OFFICE.

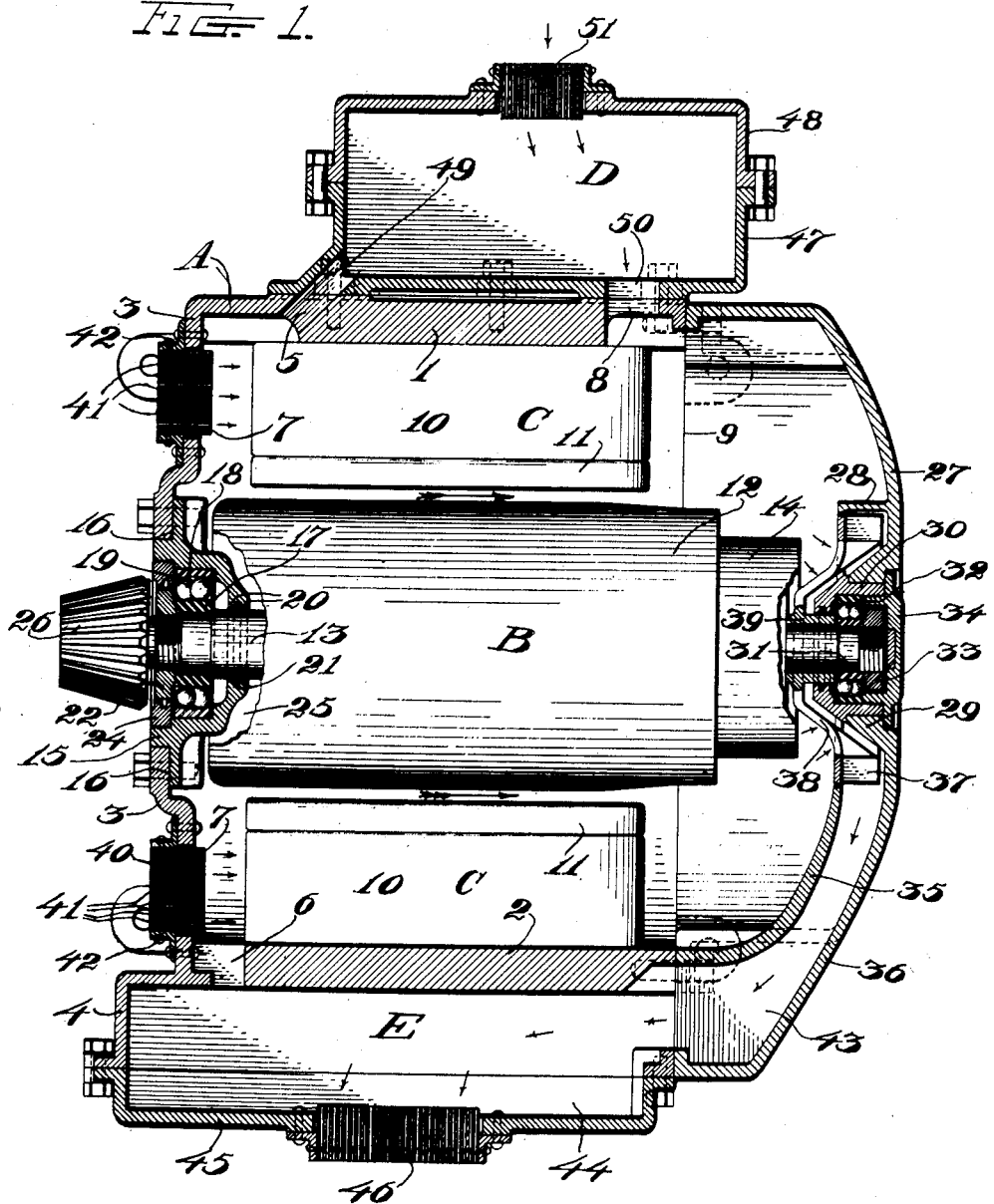

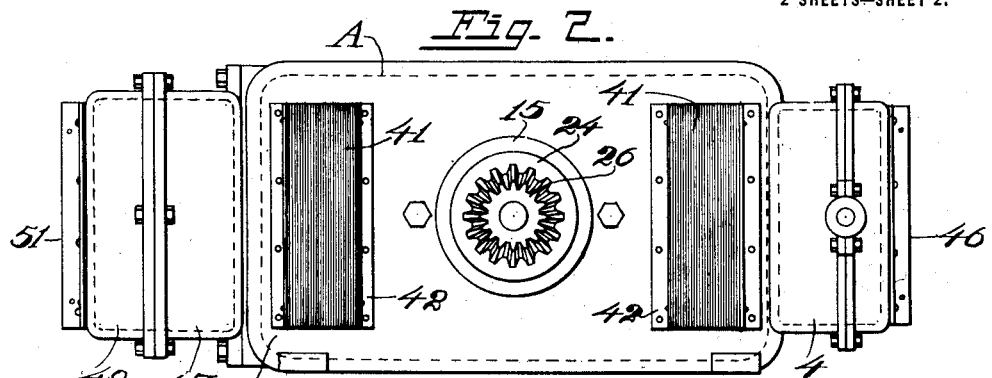
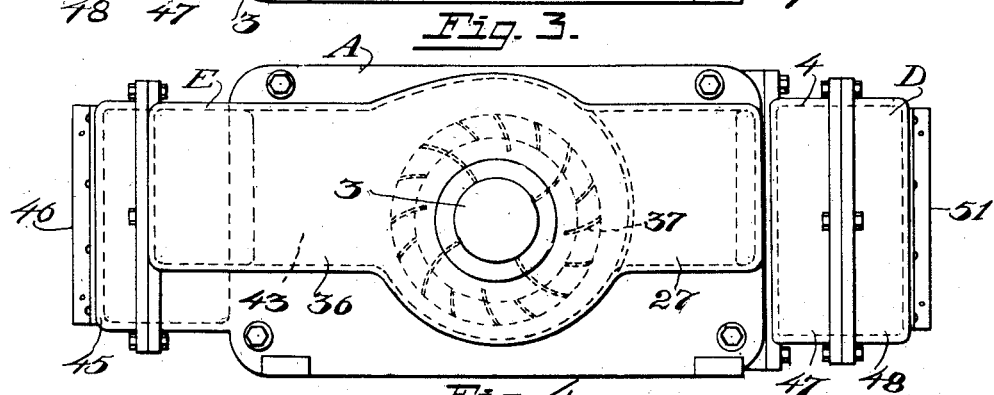
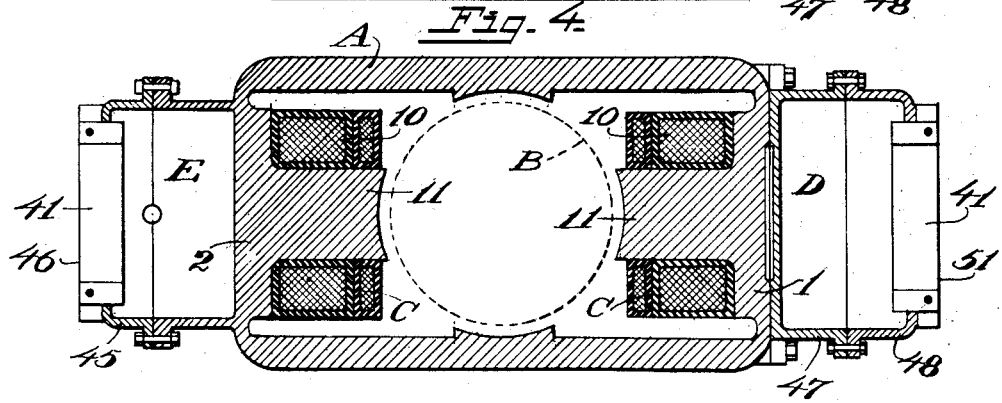
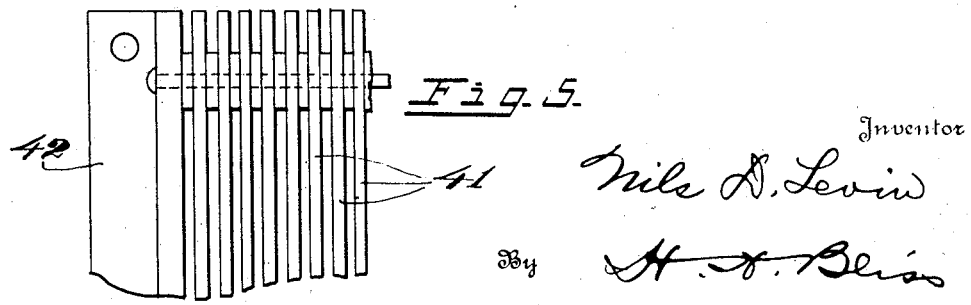

NILS D. LEVIN, OF COLUMBUS, OHIO, ASSIGNOR TO THE JEFFREY MANUFACTURING COMPANY, OF COLUMBUS, OHIO, A CORPORATION OF OHIO.

ELECTRIC MOTOR.

1,351,294.     Specification of Letters Patent.    Patented Aug. 31, 1920.

Application filed April 7, 1916. Serial No. 89,650.

*To all whom it may concern:*

Be it known that I, NILS D. LEVIN, a citizen of the United States, residing at Columbus, in the county of Franklin and State of Ohio, have invented certain new and useful Improvements in Electric Motors, of which the following is a specification, reference being had therein to the accompanying drawing.

This invention relates to improvements in electric motors and is intended to adapt them specially for use in mines and other places where there is apt to be sparking or firing at points in the machine where circuits are made and broken, with an accompanying danger of flame passing from the interior, outward, to external gases. It is the especial object of this invention to provide a compact and convenient explosion-proof motor, adapted to withstand the strenuous duty in coal mines and provided with adequate means for the ventilation of the parts liable to become heated by service.

Figure 1 is a horizontal section of a motor constructed in accordance with my invention;

Fig. 2 is an elevation of the motor illustrated in Fig. 1, from the gear side;

Fig. 3 is an elevation of the motor illustrated in Fig. 1, from the commutator side;

Fig. 4 is a cross sectional view taken along the transverse central plane of the motor illustrated in Fig. 1;

Fig. 5 is a fragmentary detail on an enlarged scale of the ventilator screens.

In the drawings, the principal parts of an electric motor are shown, more or less conventionally. The motor field frame is indicated, as an entirety, by A, the armature by B, the field magnets by C, the starting and controlling box by D, and the resistance box by E. The parts constituting the electric circuits through the motor may be of any suitable character. I have, however, designed and shaped parts of such a motor to attain superior results, as concerns the preventing of the escape of inflamed gases from the interior of the structure, and devices for securing proper ventilation.

The motor field frame, proper, comprises the vertical side walls 1 and 2, and the end plate 3 at the pinion end of the armature. The side wall 1 is adjacent to the starting and controlling box and the side wall 2 is adjacent to the resistance box. The plate 3 and side wall 2 have cast with them an offset extension 4, to serve as part of the wall of the resistance box. In the side wall 1, there is formed a passageway 5, through which can be passed the circuit wires from the starting and controlling box. At 6, the other side wall 2 is cast with a passage for a similar purpose. At 7, 7, there are openings formed in the end plate or face plate 3. In the side wall, there is also formed a passageway 8 for air currents, as will be described. The end of the frame or field element is, on the side opposite to the plate 3, cast open, the line of the surface at the edge being indicated by 9.

To the side walls there are secured the field coils 9 and pole pieces 10 and 11.

The armature B comprises the coil structure 12, the shaft 13, and the commutator 14. The shaft is fitted air and gas-tight in supports, however, which comprise the several parts of a ball bearing. At the pinion end, the large cup-like casting 15, bolted to the face plate 3 at 16, carries the inner ring 17 and the outer ring 18 of the bearing having the balls 19. The casting extends inside of these and is brought close to the shaft, as shown at 20, and carries a packing ring or washer 21. On the outer side of the ball bearing is the collar 22 threaded to the shaft, and the retaining ring 24 secured by a thread to the casting 15. The coiled part of the armature is formed with a central chamber 25, in which is situated the inner part of the cup-like casting 15.

The devices just described provide not only a gas-tight but an anti-friction bearing, and the parts are so compactly arranged that the pinion 26 is brought close into the coiled part of the armature; one of the purposes of the design being to provide a frictionless, gas-tight motor which can be used within the restricted spaces allowed for motors on mine locomotives.

The armature, at the other end, is supported as follows: 27 indicates, as an entirety, a large, concave casting. It is bolted against the field frame so as to close, gastight, the chamber in the interior. It is further cast with an inwardly projecting housing 28 and an inwardly turned, conical supporting device 29. The latter part holds the gas-tight ball bearing devices at the commutator end of the armature shaft. 30 is a sleeve fitted in the supporting boss 29 and inserted thereinto from the inside. It has a radially enlarged central chamber in which is fitted the inner ring 31 and the outer ring 32, which confine the balls of the bearing. 33 is a ring nut secured upon the shaft and having a radial flange which lies outside of the balls. 34 is a closing cap, having a sleeve part which is threaded to engage the sleeve 30, and having a radial flange fitted in a seat in the support 29, and providing a gas-tight closure.

The casting 27 is also formed with the inner wall 35 and the outer wall 36 of an air duct 43 which communicates with the interior of the housing 28.

Upon the armature I mount, and to it secure, a fan structure having the blades 37 and the blade-carrying arms 38. The blades and their arms may be cast integral with a sleeve hub 39, which is fitted to the shaft. The blades 37 are positioned in the housing 28.

In each of the aforesaid apertures in the face plate 3, there is arranged a flameproof ventilator 40, of any preferred design for permitting air to enter the chamber in the interior of the motor. For purposes of illustration I have shown ventilators of the well known design comprising a series of thin brass plates 41, placed parallel, and close together, with thin spacing plates between them, and then all of the plates of the series are fastened together by riveting, or in any other suitable manner. At each end of the pile or stack of plates, there is an angle bar 42, which is riveted or bolted to the face plate 3, and is machined to form a perfectly gas-tight joint. By constructing the ventilators in this plan, I provide prolonged, reduced passages for the air which can enter the motor in sufficiently large volumes to effectively cool the parts of the motors, and at the same time, prevent any flame from escaping outward.

When the fan at 37, 38, is rotating rapidly, the air from the interior of the motor is drawn into the casing 28 and forced along the duct 43 into the resistance box. This box has a closing cap or plate 44 in the outer wall 45 of which there is formed a flame proof ventilator 46. The air which is forced by the fan 37 through the duct 43, finally escapes through the flame-proof ventilator 46, the latter, in turn, preventing any burning gas from the interior from escaping outside.

It is desirable to also cool the starting and controlling box D, and its contents. It has an inner part 47 and an outer part 48. The part 47 has a wire passage 49, registering with the wire passage 5 in the side wall of the motor, and an air passage 50 registering with the air passage 8 in said side wall. The outer part 48 of the starting box is also provided with a flame-proof ventilator at 51.

When the fan 37 is in operation, air is drawn in through the ventilator 51, through the starting box, and thence toward the fan. The paths of the air currents that enter through the ventilators at 40 and 51 are across and around the field magnets on lines approximately parallel to the axis of the armature, and then into the chamber around the commutator, and thence to the fan casing. The parts of the electric circuits which are liable to be heated are, in this way, kept sufficiently cool.

What I claim is:

1. In an electric motor having a field frame which constitutes a coil supporting and armature inclosing casing, an armature therein mounted upon a shaft which is supported in bearings wholly inclosed within the casing, chambers at opposite sides of the motor casing adapted respectively to inclose a controlling switch and a controlling resistance, ventilators in the walls of said chambers, passages formed in the casing connecting said chambers with the interior of the casing, a fan casing formed in the walls of the motor casing, a fan mounted upon the armature shaft to revolve in the fan casing to cause the flow of air through the ventilators and passages of the casing as and for the purpose set forth.

2. In an electric motor having a field frame which constitutes a coil supporting and armature inclosing casing, an armature therein mounted upon a shaft which is supported in bearings wholly inclosed within the casing, chambers at opposite sides of the motor casing adapted respectively to inclose a controlling switch and a controlling resistance, flame proof ventilators in the walls of said chambers, passages formed in the casing connecting said chambers with the interior of the casing, a fan casing formed in the walls of the motor casing, a fan mounted upon the armature shaft to revolve in the fan casing to cause the flow of air through the ventilators and passages of the casing as and for the purpose set forth.

3. In an electric motor having a field frame which constitutes a coil supporting and armature inclosing casing, an armature therein mounted upon a shaft which is supported in bearings wholly inclosed within the casing, chambers at opposite sides of the motor casing adapted respectively to inclose a controlling switch and a controlling resistance, flame tight ventilators in the walls of said chambers, a flame tight air inlet ventilator in one of the end walls of the motor casing, a fan casing formed in the opposite end wall of the motor casing, a passage formed in the wall of the motor casing connecting one of said chambers with the interior of the motor casing, a passage formed in the walls of the motor casing connecting the fan casing with the other of said chambers, and a fan mounted upon the armature shaft to rotate in the fan casing to cause a flow of air through the ventilators and passages of the casing as and for the purpose set forth.

4. In an electric motor having a field frame which constitutes a coil supporting and armature inclosing casing, an armature therein mounted upon a shaft which is supported in flame proof bearings, chambers at opposite sides of the motor casing adapted respectively to inclose a controlling switch and a controlling resistance, flame tight ventilators in the walls of the chambers, a flame tight air inlet ventilator in one of the end walls of the motor casing, a fan casing formed in the opposite end wall of the motor casing, a passage formed in the wall of the motor casing connecting one of said chambers with the interior of the motor casing, a passage formed in the wall of the motor casing connecting the fan casing with the other of said chambers, and a fan mounted upon the armature shaft to rotate in the fan casing to cause a flow of air through the ventilators and passages of the casing as and for the purpose set forth.

5. An electric motor having a coil supporting and armature inclosing field frame, an armature therein mounted upon an armature shaft supported by flame proof bearings, a flame tight starting and controlling box and a flame tight resistance box attached by gas tight joints to the side walls of the motor casing, a fan casing formed integral with the walls of the motor casing and communicating with the interior of said casing, a duct formed integral with the motor casing extending from the fan casing to the interior of one of the attached boxes, a passage formed in the walls of the casing connecting the other attached box with the interior of the motor casing, flame proof ventilators in the walls of the starting and controlling box and of the resistance box, a fan mounted upon the armature shaft to revolve in the fan casing to cause a flow of air through the ventilators and passages of the casings as and for the purpose set forth.

6. In an electric motor having a coil supporting and armature inclosing field frame, an armature therein mounted upon an armature shaft supported by flame proof bearings, a flame tight starting and controlling box and a flame tight resistance box secured by gas tight joints to the side walls of the motor casing, passages formed in the walls of the casing connecting the starting and controlling box and the resistance box with the interior of the motor casing, flame proof ventilators in the walls of the starting and controlling box and of the resistance box, and means actuated by the rotation of the armature to cause a positive flow of air through the ventilators and passages of the casing as and for the purpose set forth.

7. In an electric motor having a field frame which constitutes a coil supporting and armature inclosing casing, an armature therein mounted upon a shaft which is supported in flame proof bearings, chambers at opposite sides of the motor casing adapted respectively to inclose a controlling switch and a controlling resistance, flame proof ventilators in the walls of said chambers, passages formed in the casing connecting said chambers with the interior of the motor casing, a fan casing formed in the walls of the motor casing, a fan mounted upon the armature shaft to revolve in the fan casing to cause the flow of air through the ventilators and passages of the casing as and for the purpose set forth.

8. In an electric motor having a field frame which constitutes a coil supporting and armature inclosing casing, an armature therein mounted upon a shaft which is supported in flame proof bearings, a plurality of chambers at the sides of the motor casing adapted to inclose auxiliary motor controlling devices, flame proof ventilators in the walls of said chambers, passages formed in the casing connecting said chambers with the interior of the motor casing, a fan casing formed in the walls of the motor casing, a fan mounted upon the armature shaft to revolve in the fan casing to cause the flow of air through the ventilators and passages of the casing as and for the purpose set forth.

In testimony whereof, I affix my signature, in presence of two witnesses.

NILS D. LEVIN.

Witnesses:
 DUDLEY T. FISHER,
 HARRY C. DEAN.